United States Patent
Alsalim

(10) Patent No.: US 10,936,436 B2
(45) Date of Patent: Mar. 2, 2021

(54) USING SNAPSHOTS FOR DATA BACKUPS

(71) Applicant: Saudi Arabian Oil Company, Dhahran (SA)

(72) Inventor: Ahmed Saad Alsalim, Damman (SA)

(73) Assignee: Saudi Arabian Oil Company, Dhahran (SA)

( * ) Notice: Subject to any disclaimer, the term of this patent is extended or adjusted under 35 U.S.C. 154(b) by 218 days.

(21) Appl. No.: 16/057,461

(22) Filed: Aug. 7, 2018

(65) Prior Publication Data
US 2020/0050516 A1  Feb. 13, 2020

(51) Int. Cl.
*G06F 11/14* (2006.01)
*G06F 16/18* (2019.01)
*G06F 16/172* (2019.01)
*G06F 16/11* (2019.01)

(52) U.S. Cl.
CPC ........ *G06F 11/1461* (2013.01); *G06F 16/128* (2019.01); *G06F 16/172* (2019.01); *G06F 16/1858* (2019.01); *G06F 2201/84* (2013.01)

(58) Field of Classification Search
CPC ............ G06F 11/1416; G06F 16/1858; G06F 16/172; G06F 2201/84; G06F 11/1446
See application file for complete search history.

(56) References Cited

U.S. PATENT DOCUMENTS

| 8,578,100 | B1 * | 11/2013 | Huynh | G06F 12/0804 711/135 |
| 9,075,754 | B1 | 7/2015 | Sadhu | |
| 2003/0093443 | A1 | 5/2003 | Huxoll | |
| 2003/0212870 | A1 | 11/2003 | Nowakowski | |
| 2009/0083345 | A1 * | 3/2009 | Sudo | H04L 67/1097 |
| 2016/0062671 | A1 * | 3/2016 | Iwasaki | G06F 16/11 707/640 |
| 2016/0077926 | A1 * | 3/2016 | Mutalik | G06F 3/0683 711/162 |
| 2017/0262217 | A1 * | 9/2017 | Pradhan | G06F 3/0605 |
| 2017/0315877 | A1 * | 11/2017 | Kaplingat | G06F 11/1469 |
| 2018/0316577 | A1 * | 11/2018 | Freeman | H04L 41/5009 |
| 2019/0095284 | A1 * | 3/2019 | Balasubramanian | G06F 12/0868 |
| 2019/0278663 | A1 * | 9/2019 | Mehta | G06F 3/061 |

OTHER PUBLICATIONS

International Search Report and Written Opinion issued in International Application No. PCT/US2019/044034 dated Oct. 25, 2019, 13 pages.

* cited by examiner

*Primary Examiner* — Cam Y T Truong
(74) *Attorney, Agent, or Firm* — Fish & Richardson P.C.

(57) ABSTRACT

A computer-implemented method includes the following. A start time for a backup of data in a system is received. At the start time, a snapshot of the data in the system is captured. When an environment of the system is a database environment, the capturing includes setting a status of a database to backup mode and freezing data files in the database while permitting applications to run. When the environment of the system is a non-database environment, and when a file system type is general parallel file system (GPFS), the capturing includes caching new input/output operations to a cache and starting a timer (counter) for flushing the cache. At a specified time, the snapshot is copied to media, setting the status of the database to normal mode, and providing copying notifications to users.

14 Claims, 3 Drawing Sheets

US 10,936,436 B2

USING SNAPSHOTS FOR DATA BACKUPS

BACKGROUND

The present disclose applies to the field of data backups. Conventional techniques for performing backups, including hard disk backups, can require an interruption in service. For example, a system can be taken down and can be unavailable to users while a backup is being performed. Conventional backup techniques typically lack mechanisms for generating alerts that pinpoint problematic steps that may occur during the backup. Conventional backup techniques also typically lack the ability to perform a fast online consistent image-level backup for storage hard disks to protect mission critical databases.

SUMMARY

The present disclosure describes techniques that can be used for backing up mission critical data using storage snapshotting without application downtime. In some implementations, a computer-implemented method includes the following. A start time for a backup of data in a system is received. At the start time, a snapshot of the data in the system is captured. When an environment of the system is a database environment, the capturing includes setting a status of a database to backup mode and freezing data files in the database while permitting applications to run. When the environment of the system is a non-database environment, and when a file system type is general parallel file system (GPFS), the capturing includes caching new input/output operations to a cache and starting a timer (counter) for flushing the cache. At a specified time, the snapshot is copied to media, setting the status of the database to normal mode, and providing copying notifications to users.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

Implementations described in this disclosure can realize one or more of the following advantages. First, backup techniques using snapshotting do not require service interruption and allow problematic steps to be identified. Second, backup techniques can monitor all critical steps to streamline problem analysis scope.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various figures indicate like elements.

DETAILED DESCRIPTION

The present disclosure describes techniques for backing up mission critical data using storage snapshotting without application downtime. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Backup techniques can allow information technology support teams to protect their data by having a fast and consistent online backup process for all mission critical systems. Further, operation support teams can be notified of the status of each step of the backup process so that the operation support teams can respond to potential issues that occur during the backup process. The backup techniques can include the use of storage components for storing snapshots that are captured and stored without shutting down applications.

Backup techniques using snapshotting can include the following features: First, applications can continue to run during the backup process, providing an advantage over conventional systems that must be stopped before taking a snapshot of data that is in use or being modified. Second, application data is not directly backed up immediately, but rather the backup is postponed, providing an advantage over conventional systems that backup actual data of an application while the application is required to be in a stopped state. For example, techniques described in this disclosure include a first step of capturing a snapshot of the data to be backed up and a second step of copying that data to other forms of media. Third, the application data backup process can be asynchronous in that the transfer copy process can take place at any time after the snapshot occurs. This is an advantage over conventional systems in which copies to other forms of media occur immediately after a snapshot. Fourth, the application data backup process can allow status queries to occur during any time.

Figure 1:
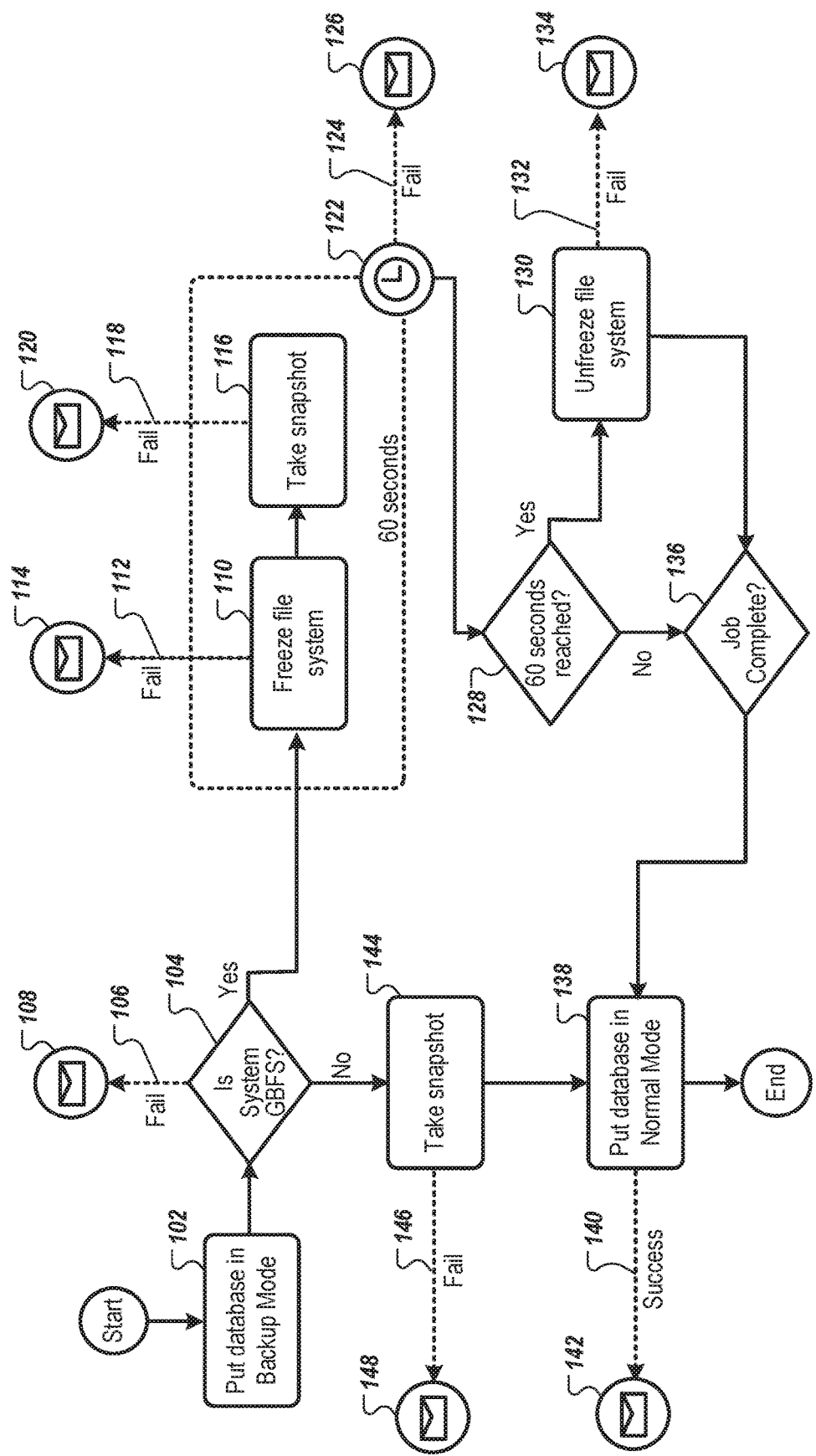
FIG. 1 is a flow diagram showing an example of a workflow for performing a backup, according to some implementations of the present disclosure.

FIG. 1 is a flow diagram showing an example of a workflow 100 for performing a backup, according to some implementations of the present disclosure. Generally, the backup can be started, for example, when a backup time arrives. At that time, steps of the workflow 100 can be initiated to copy a snapshot of application data to storage media. If an executing application is currently using a database, the database can be switched to Backup mode. The workflow 100 can include freezing the database, which can protect the data files from inconsistencies while keeping the application running for clients. Detailed steps of the workflow 100 are now described.

At 102, when a backup process is started, a status of the database is changed to Backup mode. Before the change of status, the database may typically be in Normal mode, for example. The backup process can be started, for example, when a backup start time is reached for the backup to commence (indicating a time at which a snapshot is to be taken of application data). The backup start time for the backup can be designated manually at any time, such as by an operator or administrator of the system. In another example, the backup start time can be obtained from a schedule, such as from a database table. From 102, workflow 100 proceeds to 104.

At 104, a determination is made as to whether the file system type of the system is general parallel file system (GPFS). The file system type can be checked, for example, if the application is running in a non-database environment. When the file system type is GPFS, new input/output operations initiated by the application (and that occur during the backup process) can be cached, such as to save transactions for application to the database until the snapshot is complete. Caching typically does not occur for non-GPFS systems. If a failure 106 occurs during the time that the GPFS determination is being made, a notification 108, such as an email message, can be sent. Notifications can be sent, for example, to stakeholders and support groups. From 104, when the file system type is GPFS, workflow 100 proceeds to 110. Otherwise, when the file system type is non-GPFS, workflow 100 proceeds to 144.

If the file system type is GPFS, then the file system is frozen at 110. For example, in some environments, freezing capabilities can be provided as part of the operating system (OS), such as to perform OS-side freezing. In other environments, for example Advanced Interactive eXecutive (AIX), a command can be used to check the file system type, and then freezing can occur when the system file type is GPFS. In this way, consistent snapshots can be taken. If a failure 112 occurs during the file system freezing step, then a notification 114 can be sent (for example, to stakeholders and support groups). From 110, workflow 100 proceeds to 116.

At 116, a snapshot of the application data is taken. For example, the snapshot can be initiated manually or scheduled using a graphical user interface (GUI). In another example, the snapshot can be initiated through a command line on a management server, such as by executing a command that include the proper options that define the snapshot. In another example, the snapshot can be initiated through an application programming interface (API). In this example, application code can be developed to call the API through which the snapshot is initiated from the client side, including performing pre-snapshot tasks and post-snapshot tasks, such as freezing and unfreezing the database. If a failure 118 occurs during the snapshot step, then a notification 120 can be sent (for example, to stakeholders and support groups). From 116, workflow 100 proceeds to 122.

After the snapshot is taken, a time delay 122 (for example, 60 seconds) is started. Starting the time delay 122 can include using a counter to start counting for a specified length of time that defines a time period in which the cached I/O operations are flushed. If a failure 124 occurs during the starting of the time delay 122, then a notification 126 can be sent (for example, to stakeholders and support groups). If the time that is being taken to flush cached I/O operations is determined to be exceeding a threshold, or a prediction is made that the time will exceed the time delay 122, then notifications can be sent to alert stakeholders and to provide status information to support groups. From 122, workflow 100 proceeds to 128.

At 128, a determination is made whether the time delay 122 has been reached. From 128, when the time delay 122 has been reached, workflow 100 proceeds to 130; otherwise workflow 100 proceeds to 136.

At 130, the file system is unfrozen, for example using OS-level capabilities. If a failure 132 occurs during the unfreezing of the file system, then a notification 134 can be sent (for example, to stakeholders and support groups). From 130, workflow 100 proceeds to 136.

At 136, a determination is made whether the snapshot is complete. From 136, workflow 100 proceeds to 138.

At 138, the status of the database is placed in Normal mode. If the backup process is still successful (140) at this time, then a notification 142 can be sent (for example, to stakeholders and support groups). From 138, workflow 100 stops.

At 144 (when the file system type is non-GPFS, as determined at 104), the snapshot of the application data is taken. If a failure 146 occurs during the snapshot step, then a notification 148 can be sent (for example, to stakeholders and support groups). From 144, workflow 100 proceeds to 138.

The time delay 122 can also be used as a wait time, indicating a specified time before starting a copy from the snapshotted data to other forms of media. For example, the snapshotted data can be copied to local or remote storage, or the snapshotted data can be copied to the cloud. During the process of performing the backup (including the snapshot), notifications can be used to provide status updates to stakeholders and support groups. Notifications can also occur when the copying of the snapshotted information is complete.

Figure 2:
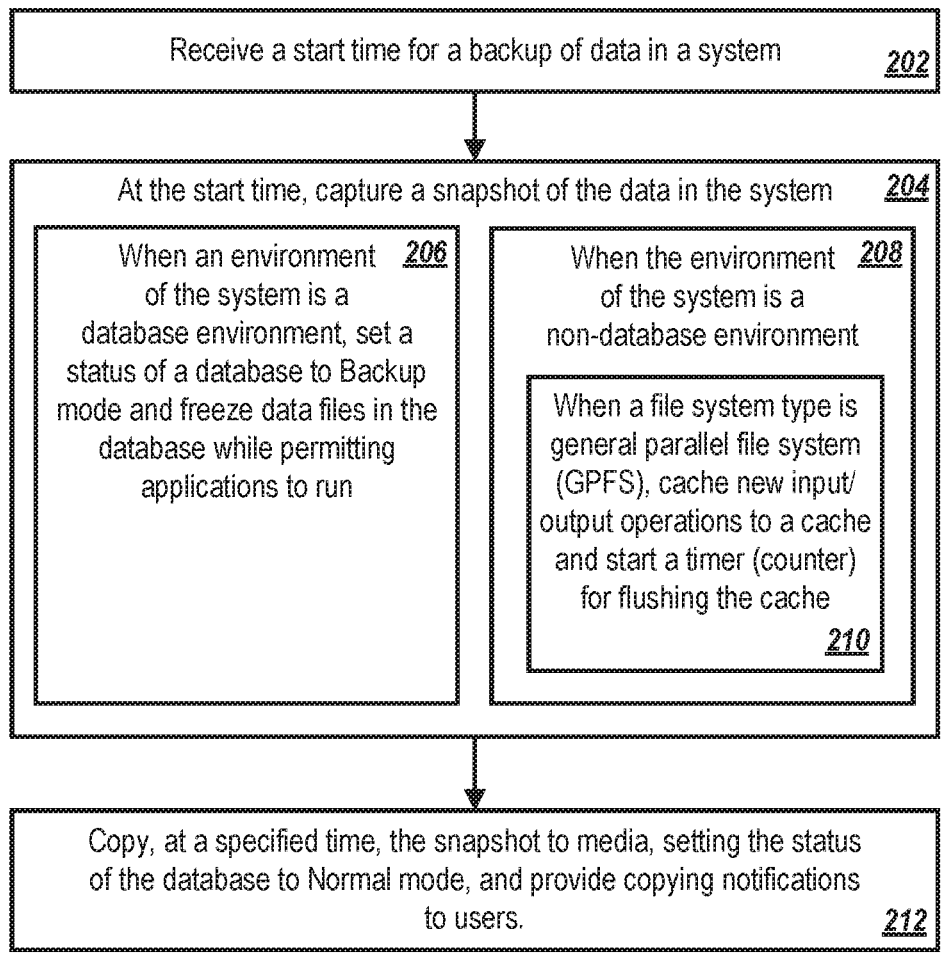
FIG. 2 is a flowchart showing an example of a method for performing a backup, according to some implementations of the present disclosure.

FIG. 2 is a flowchart showing an example of a method 200 for performing a backup, according to some implementations of the present disclosure. For clarity of presentation, the description that follows generally describes method 200 in the context of the other figures in this description. However, it will be understood that method 200 may be performed, for example, by any system, environment, software, and hardware, or a combination of systems, environments, software, and hardware. In some implementations, various steps of method 200 can be run in parallel, in combination, in loops, or in any order.

At 202, a start time for a backup of data in a system is received. For example, an administrator of a system can specify a start time for a backup to be performed for backing up application data of an application. In another example, the start time can be read from a schedule or a data base that identifies start times for backups to be performed. The start time can be received, for example, by an application or a script that is set up to perform backups. The receipt of the start time can occur, for example, before the initial steps of the workflow 100 are performed. From 202, method 200 proceeds to 204.

At 204, at the start time, a snapshot of the data in the system is captured. The snapshot that is captured can correspond, for example, to the snapshot 116 or the snapshot 144 described with reference to FIG. 1. The snapshot can be initiated manually, for example, through a command line on a management server. In another example, the snapshot can be initiated through an API. From 204, method 200 proceeds to either 206 or 208, depending on whether or not the environment of the system is a database environment.

At 206, when an environment of the system is a database environment, before the snapshot is captured, a status of a database is set to backup mode, and data files in the database are frozen while permitting applications to run. Setting the status to Backup mode can occur automatically, such as in a set of pre-snapshot tasks. From 206, method 200 proceeds to 212.

At 208, when the environment of the system is a non-database environment, and when (at 210) a file system type is general parallel file system (GPFS), new input/output operations are cached to a cache, and a timer (counter) is started for flushing the cache. For example, operations that are produced by the application for which the backup is occurring can still occur, and the operations can be held for application to the database at a later time (for example, when the snapshot is complete). From 208, method 200 proceeds to 212.

At 212, at a specified time, the snapshot is copied to media, the status of the database is set to Normal mode, and copying notifications are provided to users. Notifications that are provided to users can include, for example, email messages, text message, or status displays in applications. From 212, method 200 stops.

Figure 3:
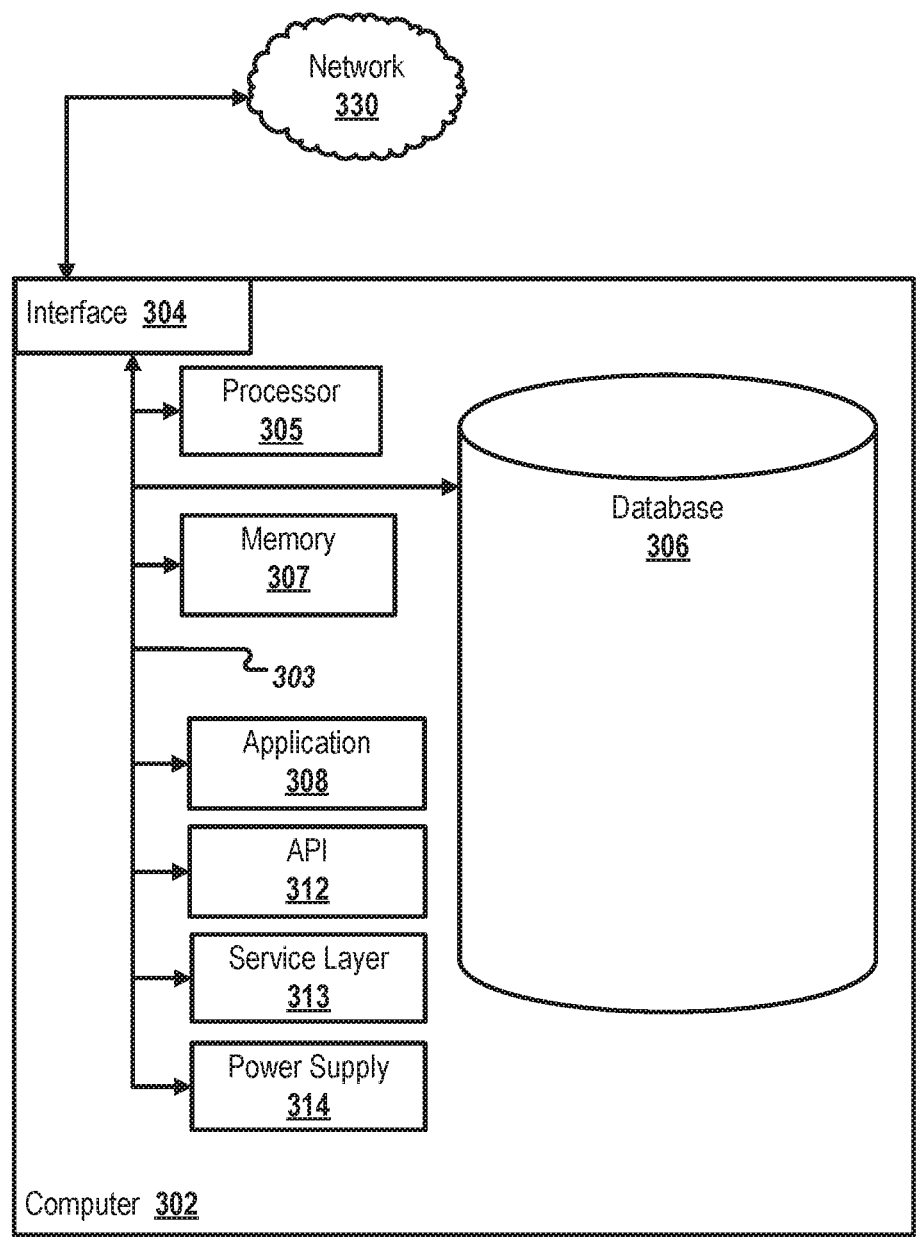
FIG. 3 is a block diagram illustrating an example computer system used to provide computational functionalities associated with described algorithms, methods, functions, processes, flows, and procedures as described in the instant disclosure, according to some implementations of the present disclosure.

FIG. 3 is a block diagram of an example computer system 300 used to provide computational functionalities associated with described algorithms, methods, functions, processes, flows, and procedures, as described in the instant disclosure, according to some implementations of the present disclosure. The illustrated computer 302 is intended to encompass any computing device such as a server, desktop computer, laptop/notebook computer, wireless data port, smart phone, personal data assistant (PDA), tablet computing device, one or more processors within these devices, or any other processing device, including physical or virtual instances (or both) of the computing device. Additionally, the computer 302 may comprise a computer that includes an input device, such as a keypad, keyboard, or touch screen that can accept user information, and an output device that conveys information associated with the operation of the computer 302, including digital data, visual, or audio information (or a combination of information), or a graphical-type user interface (UI) (or GUI).

The computer 302 can serve in a role as a client, network component, a server, a database, a persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, or global environment (or a combination of environments).

The computer 302 is an electronic computing device operable to receive, transmit, process, store, or manage data and information associated with the described subject matter. According to some implementations, the computer 302 may also include or be communicably coupled with an application server, email server, web server, caching server, or streaming data server (or a combination of servers).

The computer 302 can receive requests over network 330 from a client application (for example, executing on another computer 302) and respond to the received requests by processing the received requests using software applications. In addition, requests may also be sent to the computer 302 from internal users (for example, from a command console or another access method), external or third-parties, other automated applications, as well as entities, individuals, systems, or computers.

Each of the components of the computer 302 can communicate using a system bus 303. In some implementations, any or all of the components of the computer 302, hardware or software (or a combination of both hardware and software), may interface with each other or the interface 304 (or a combination of both), over the system bus 303 using an API 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 and other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or another language providing data in extensible markup language (XML) format. While illustrated as an integrated component of the computer 302, alternative implementations may illustrate the API 312 or the service layer 313 as stand-alone components in relation to other components of the computer 302 and other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems that are connected to the network 330 (whether illustrated or not) in a distributed environment. Generally, the interface 304 comprises logic encoded in software or hardware (or a combination of software and hardware) and is operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 and other components (or a combination of both) that can be connected to the network 330 (whether illustrated or not). For example, database 306 can be an in-memory or conventional database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302 and other components (or a combination of both) that can be connected to the network 330 (whether illustrated or not). Memory 307 can store any data consistent with this disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, or applications. Further, although illustrated as a single application 308, the application 308 may be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or a different power management functionality). In some implementations, the power-supply 314 can include a power plug to allow the computer 302 to be plugged into a wall socket to, for example, power the computer 302 or recharge a rechargeable battery.

There may be any number of computers 302 associated with, or external to, a computer system containing computer 302, each computer 302 communicating over network 330. Further, the term "client," "user," and other terminology may be used interchangeably without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method, comprising the following: A start time for a backup of data in a system is received. At the start time, a snapshot of the data in the system is captured. When an environment of the system is a database environment, the capturing includes setting a status of a database to backup mode and freezing data files in the database while permitting applications to run. When the environment of the system is a non-database environment, and when a file system type is general parallel file system (GPFS), the capturing includes caching new input/output operations to a cache and starting a timer (counter) for flushing the cache. At a specified time, the snapshot is copied to media, setting the status of the database to normal mode, and providing copying notifications to users.

The foregoing and other described implementations can each, optionally, include one or more of the following features:

A first feature, combinable with any of the following features, wherein the start time is received from an administrator of a system.

A second feature, combinable with any of the previous or following features, wherein the start time is received from a schedule or a data base that identifies start times for backups to be performed.

A third feature, combinable with any of the previous or following features, wherein the start time is received from an application or a script that is set up to perform backups.

A fourth feature, combinable with any of the previous or following features, wherein the notification is at least one of an email messages, a text message, or a status display in an application.

A fifth feature, combinable with any of the previous or following features, the method further comprising: further comprising: determining that a time needed to flush cached I/O operations exceeds a threshold; and providing notifications alerting stakeholders.

A sixth feature, combinable with any of the previous or following features, wherein the threshold is 60 seconds.

In a second implementation, a non-transitory, computer-readable medium storing one or more instructions executable by a computer system to perform operations comprising the following. A start time for a backup of data in a system is received. At the start time, a snapshot of the data in the system is captured. When an environment of the system is a database environment, the capturing includes setting a status of a database to backup mode and freezing data files in the database while permitting applications to run. When the environment of the system is a non-database environment, and when a file system type is general parallel file system (GPFS), the capturing includes caching new input/output operations to a cache and starting a timer (counter) for flushing the cache. At a specified time, the snapshot is copied to media, setting the status of the database to normal mode, and providing copying notifications to users.

The foregoing and other described implementations can each, optionally, include one or more of the following features:

A first feature, combinable with any of the following features, wherein the start time is received from an administrator of a system.

A second feature, combinable with any of the previous or following features, wherein the start time is received from a schedule or a data base that identifies start times for backups to be performed.

A third feature, combinable with any of the previous or following features, wherein the start time is received from an application or a script that is set up to perform backups.

A fourth feature, combinable with any of the previous or following features, wherein the notification is at least one of an email messages, a text message, or a status display in an application.

A fifth feature, combinable with any of the previous or following features, the operations further comprising: further comprising: determining that a time needed to flush cached I/O operations exceeds a threshold; and providing notifications alerting stakeholders.

A sixth feature, combinable with any of the previous or following features, wherein the threshold is 60 seconds.

In a third implementation, a computer-implemented system. The system includes one or more processors. The system also includes a non-transitory computer-readable storage medium coupled to the one or more processors and storing programming instructions for execution by the one or more processors. The programming instructions instruct the one or more processors to perform operations comprising the following. A start time for a backup of data in a system is received. At the start time, a snapshot of the data in the system is captured. When an environment of the system is a database environment, the capturing includes setting a status of a database to backup mode and freezing data files in the database while permitting applications to run. When the environment of the system is a non-database environment, and when a file system type is general parallel file system (GPFS), the capturing includes caching new input/output operations to a cache and starting a timer (counter) for flushing the cache. At a specified time, the snapshot is copied to media, setting the status of the database to normal mode, and providing copying notifications to users.

The foregoing and other described implementations can each, optionally, include one or more of the following features:

A first feature, combinable with any of the following features, wherein the start time is received from an administrator of a system.

A second feature, combinable with any of the previous or following features, wherein the start time is received from a schedule or a data base that identifies start times for backups to be performed.

A third feature, combinable with any of the previous or following features, wherein the start time is received from an application or a script that is set up to perform backups.

A fourth feature, combinable with any of the previous or following features, wherein the notification is at least one of an email messages, a text message, or a status display in an application.

A fifth feature, combinable with any of the previous or following features, the operations further comprising: further comprising: determining that a time needed to flush cached I/O operations exceeds a threshold; and providing notifications alerting stakeholders.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other conventional operating system.

A computer program, which may also be referred to or described as a program, software, a software application, a module, a software module, a script, or code can be written in any form of programming language. A computer program can include compiled or interpreted languages, or declarative or procedural languages. A computer program can be deployed in any form, including as a stand-alone program or as a module, component, or subroutine for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or processes, the programs may instead include a number of sub-modules, third-party services, components, or libraries. Conversely, the features and functionality of various components can be combined into single components. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers that can be used for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other information including any parameters, variables, algorithms, instructions, rules, constraints, or references. Additionally, the memory may include any other data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, or data (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in the present disclosure can be any file system type accessible from multiple servers for read and update. Locking or consistency tracking is not necessary since the locking of exchange file system can be done at application layer. Furthermore, Unicode data files are different from non-Unicode data files.

While this specification contains many specific implementation details, these should not be construed as limitations on the scope of the present disclosure or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving a start time for a backup of data in a computer system;
at the start time, capturing a snapshot of the data in the computer system, including: when an environment of the computer system is a database environment, before the snapshot is captured, automatically setting a status of a database to backup mode and freezing data files in the database while permitting applications to run during a backup process; and
when the environment of the computer system is a non-database environment:
determining, by a processor, whether a file system type of the environment of the computer system is a general parallel file system (GPFS); and
when the file system type is the GPFS, performing, by the processor, an operating system (OS)-level freeze of the GPFS, caching new input/output (I/O) operations to a cache until the snapshot is captured completely, starting a timer for flushing the cache, and performing, at a completion of the timer, an OS-level unfreeze of the GPFS, wherein the starting of the timer includes determining that a time needed to flush the cached new I/O operations exceeds a threshold, wherein the timer defines a time period for the cached new I/O operations to be flushed;
providing, by the processor, notifications alerting stakeholders when a failure occurs during the freezing of the GPFS, a notification of the notifications is at least one of an email messages, a text message, or a status display in an application; and
copying, at a specified time, the snapshot to media, setting the status of the database to normal mode, and providing copying notifications to users.

2. The computer-implemented method of claim 1, wherein the start time is received from an administrator of a system.

3. The computer-implemented method of claim 1, wherein the start time is received from a schedule or a database that identifies start times for backups to be performed.

4. The computer-implemented method of claim 1, wherein the start time is received from an application or a script that is set up to perform backups.

5. The computer-implemented method of claim 1, wherein the threshold is 60 seconds.

6. A non-transitory computer-readable medium storing one or more instructions executable by a computer system to perform operations comprising:
receiving a start time for a backup of data in the computer system;
at the start time, capturing a snapshot of the data in the computer system, including: when an environment of the computer system is a database environment, before the snapshot is captured, automatically setting a status of a database to backup mode and freezing data files in the database while permitting applications to run during a backup process; and
when the environment of the computer system is a non-database environment:
determining, by a processor, whether a file system type of the environment of the computer system is a general parallel file system (GPFS); and
when the file system type is the GPFS, performing, by the processor, an operating system (OS)-level freeze of the GPFS, caching new input/output (I/O) operations to a cache until the snapshot is captured completely, starting a timer for flushing the cache, and performing, at a completion of the timer, an OS-level unfreeze of the GPFS, wherein the starting of the timer includes determining that a time needed to flush the cached new I/O operations exceeds a threshold, wherein the timer defines a time period for the cached new I/O operations to be flushed;
providing, by the processor, notifications alerting stakeholders when a failure occurs during the freezing of the GPFS, a notification of the notifications is at least one of an email messages, a text message, or a status display in an application; and
copying, at a specified time, the snapshot to media, setting the status of the database to normal mode, and providing copying notifications to users.

7. The non-transitory computer-readable medium of claim 6, wherein the start time is received from an administrator of a system.

8. The non-transitory computer-readable medium of claim 6, wherein the start time is received from a schedule or a database that identifies start times for backups to be performed.

9. The non-transitory computer-readable medium of claim 6, wherein the start time is received from an application or a script that is set up to perform backups.

10. The non-transitory computer-readable medium of claim 6 wherein the threshold is 60 seconds.

11. A computer-implemented system, comprising:
a processor; and a non-transitory computer readable medium storing one or more instructions that are executed by a computer system to perform operations comprising:
receiving a start time for a backup of data in the computer system;

at the start time, capturing a snapshot of the data in the computer system, including: when an environment of the computer system is a database environment, before the snapshot is captured, automatically setting a status of a database to backup mode and freezing data files in the database while permitting applications to run during a backup process; and when the environment of the computer system is a non-database environment:

determining, by the processor, whether a file system type of the environment of the computer system is a general parallel file system (GPFS); and when the file system type is the GPFS, performing, by the processor, an operating system (OS)-level freeze of the GPFS, caching new input/output (I/O) operations to a cache until the snapshot is captured completely, starting a timer for flushing the cache, and performing, at a completion of the timer, an OS-level unfreeze of the GPFS, wherein the starting of the timer includes determining that a time needed to flush the cached new I/O operations exceeds a threshold, wherein the timer defines a time period for the cached new I/O operations to be flushed;

providing, by the processor, notifications alerting stakeholders when a failure occurs during the freezing of GPFS, a notification of the notifications is at least one of an email messages, a text message, or a status display in an application; and copying, at a specified time, the snapshot to media, setting the status of the database to normal mode, and providing copying notifications to users.

12. The computer-implemented system of claim 11, wherein the start time is received from an administrator of a system.

13. The computer-implemented system of claim 11, wherein the start time is received from a schedule or a data base that identifies start times for backups to be performed.

14. The computer-implemented system of claim 11, wherein the start time is received from an application or a script that is set up to perform backups.

\* \* \* \* \*

UNITED STATES PATENT AND TRADEMARK OFFICE
CERTIFICATE OF CORRECTION

PATENT NO. : 10,936,436 B2
APPLICATION NO. : 16/057461
DATED : March 2, 2021
INVENTOR(S) : Ahmed Saad Alsalim It is certified that error appears in the above-identified patent and that said Letters Patent is hereby corrected as shown below:

On the Title Page

Item (72) Inventors, please replace "Damman (SA)" with -- Dammam (SA) --.

In the Claims

In Column 14, Line 60, Claim 10, please replace "6" with -- 6, --.

In Column 16, Line 16-17, Claim 13, please replace "data base" with -- database --.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*